US012072666B2

(12) United States Patent
Imada et al.

(10) Patent No.: US 12,072,666 B2
(45) Date of Patent: Aug. 27, 2024

(54) SHEET CONVEYING DEVICE, FIXING DEVICE, AND IMAGE FORMING APPARATUS

(71) Applicants: Takahiro Imada, Kanagawa (JP); Yoshikuni Sasaki, Kanagawa (JP); Hiromasa Takagi, Tokyo (JP); Takuya Seshita, Kanagawa (JP); Hiroshi Yoshinaga, Chiba (JP); Arinobu Yoshiura, Kanagawa (JP)

(72) Inventors: Takahiro Imada, Kanagawa (JP); Yoshikuni Sasaki, Kanagawa (JP); Hiromasa Takagi, Tokyo (JP); Takuya Seshita, Kanagawa (JP); Hiroshi Yoshinaga, Chiba (JP); Arinobu Yoshiura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/129,107

(22) Filed: Mar. 31, 2023

(65) Prior Publication Data

US 2023/0359142 A1 Nov. 9, 2023

(30) Foreign Application Priority Data

May 6, 2022 (JP) ................................ 2022-076551
Jan. 11, 2023 (JP) ................................ 2023-002477

(51) Int. Cl.
*G03G 21/16* (2006.01)
*G03G 21/20* (2006.01)

(52) U.S. Cl.
CPC ..... *G03G 21/1685* (2013.01); *G03G 21/1695* (2013.01); *G03G 21/1638* (2013.01);
(Continued)

(58) Field of Classification Search
CPC ........... G03G 21/1685; G03G 21/1695; G03G 21/1638; G03G 21/206; G03G 2221/1639;
(Continued)

(56) References Cited

U.S. PATENT DOCUMENTS

2008/0205914 A1* 8/2008 Jeon .................. G03G 21/1638
399/21
2015/0071661 A1 3/2015 Yamashina et al.
(Continued)

FOREIGN PATENT DOCUMENTS

JP 2005-338309 12/2005
JP 2015-194678 11/2015
(Continued)

*Primary Examiner* — Sandra Brase
(74) *Attorney, Agent, or Firm* — XSENSUS LLP

(57) ABSTRACT

A sheet conveying device includes a pair of conveyors each including a conveyance face to convey a recording medium inside an image forming apparatus. One of the pair of conveyors further includes an exposed face, a handle, and a swing fulcrum. The exposed face is exposed to an outside of the apparatus while an inside of the apparatus is open. The handle is exposed to the outside of the apparatus and operatable to expose the conveyance face to the outside of the apparatus while the inside of the apparatus is open. The swing fulcrum swings the one of the pair of conveyors to expose the conveyance face to the outside of the apparatus when the handle is operated while the inside of the apparatus is open. The handle includes a partial annular portion. The partial annular portion is included in a plane including a swing direction around the swing fulcrum.

13 Claims, 9 Drawing Sheets

(52) U.S. Cl.
CPC ... *G03G 21/206* (2013.01); *G03G 2221/1639* (2013.01); *G03G 2221/1645* (2013.01); *G03G 2221/1675* (2013.01); *G03G 2221/1687* (2013.01)

(58) Field of Classification Search
CPC ..... G03G 221/1645; G03G 2221/1675; G03G 2221/1687
See application file for complete search history.

(56) References Cited

U.S. PATENT DOCUMENTS

| | | | |
|---|---|---|---|
| 2015/0268626 A1 | 9/2015 | Saito et al. | |
| 2016/0221775 A1 | 8/2016 | Yoshiura et al. | |
| 2017/0131679 A1* | 5/2017 | Koyanagi .......... | G03G 21/1638 |

FOREIGN PATENT DOCUMENTS

| | | |
|---|---|---|
| JP | 2016-141534 | 8/2016 |
| JP | 2020-106621 | 7/2020 |

* cited by examiner

SHEET CONVEYING DEVICE, FIXING DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2022-076551, filed on May 6, 2022, and 2023-002477, filed on Jan. 11, 2023, in the Japan Patent Office, the entire disclosure of each of which is hereby incorporated by reference herein.

BACKGROUND

Technical Field

Embodiments of the present disclosure relate to a sheet conveying device, a fixing device, and an image forming apparatus that facilitate jam clearance.

Related Art

In an electrophotographic image forming apparatus such as a copier, a facsimile machine, or a printer, a fixing device fixes an unfixed toner image that is transferred and borne on a sheet as a recording medium and a sheet conveying device ejects the sheet bearing the fixed toner image to the outside of the image forming apparatus.

The sheet conveying device includes a pair of conveyance guides facing both front and back sides of the sheet. Upon a conveyance failure such as a paper jam of the sheet moving between the conveyance guides, the sheet needs to be removed. In particular, the sheet passing through the fixing device is liable to cause the conveyance failure due to curling caused by heat received at the time of fixing.

SUMMARY

According to an embodiment of the present disclosure, a novel sheet conveying device includes a pair of conveyors each including a conveyance face to convey a recording medium inside an image forming apparatus. One of the pair of conveyors further includes an exposed face, a handle, and a swing fulcrum. The exposed face is exposed to an outside of the image forming apparatus while an inside of the image forming apparatus is open. The handle is exposed to the outside of the image forming apparatus and operatable to expose the conveyance face to the outside of the image forming apparatus while the inside of the image forming apparatus is open. The swing fulcrum swings the one of the pair of conveyors to expose the conveyance face to the outside of the image forming apparatus when the handle is operated while the inside of the image forming apparatus is open. The handle includes a partial annular portion. The partial annular portion is included in a plane including a swing direction around the swing fulcrum.

According to an embodiment of the present disclosure, a novel fixing device includes a heat source, a fixing rotator, a counter rotator, and the sheet conveying device. The fixing rotator rotates while being heated by the heat source. The counter rotator contacts the fixing rotator and applies pressure between the counter rotator and the fixing rotator to form a nip between the counter rotator and the fixing rotator. The conveyance face of the one of the pair of conveyors of the sheet conveying device is adjacent to the nip.

According to an embodiment of the present disclosure, a novel image forming apparatus includes the fixing device and an openable and closable member that opens the inside of the image forming apparatus to the right of the image forming apparatus relative to the front of the image forming apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
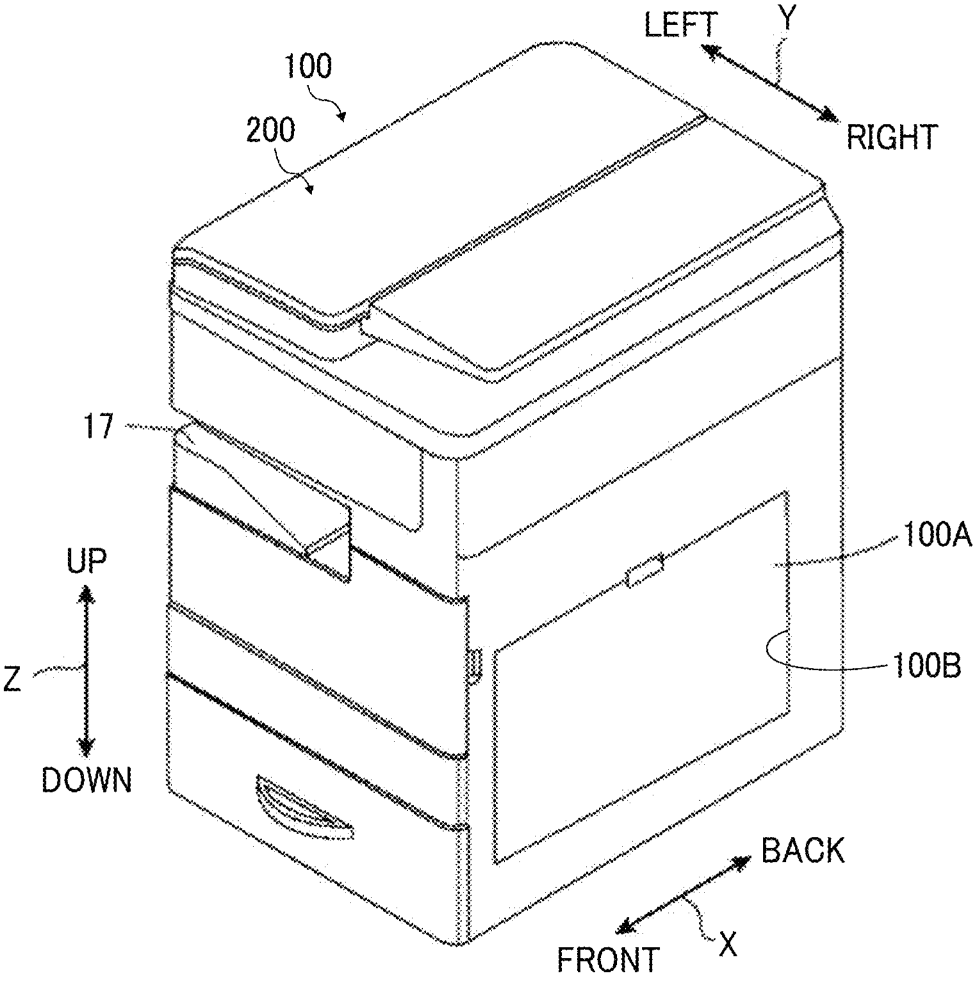
FIG. 1 is an external view of an image forming apparatus including a sheet conveying device according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

Note that, in the following description, suffixes Y, C, M, and Bk denote colors of white, yellow, magenta, cyan, and black, respectively. To simplify the description, these suffixes are omitted unless necessary.

As used herein, the term "connected/coupled" includes both direct connections and connections in which there are one or more intermediate connecting elements.

According to one or more embodiments of the present disclosure, a "sheet conveying device" includes a pair of conveyance guides serving as a pair of conveyors. Each of the conveyance guides (i.e., conveyors) includes a conveyance face to convey a recording medium inside an image forming apparatus.

As will be described later with reference to FIG. 4A, a conveyance guide 301 as one of the pair of conveyance guides is fixed, whereas a conveyance guide 302 as the other one of the pair of conveyance guides faces one side of a sheet P as a recording medium and is swingable around a swing fulcrum 302B.

A "fixing device" refers to a device that fixes, to a sheet, an unfixed toner borne on the sheet while conveying the sheet through a nip formed between a heater and a pressure rotator in a direction perpendicular to a longitudinal direction of the heater and the pressure rotator. An "image forming apparatus" refers to an apparatus that includes the fixing device and forms an image by adhering a developer or ink to a sheet serving as a recording medium on which an image is recorded.

Although a laser printer is an example of the image forming apparatus, the image forming apparatus is not limited to the laser printer. Specifically, the image forming apparatus may be any one of a copier, a facsimile machine, a printer, and an inkjet recording device, or may be a multifunction peripheral (MFP) having at least two functions of the copier, the facsimile machine, the printer, and the inkjet recording device.

Although the "recording medium" will be described as a "sheet" in the embodiments below, the "recording medium" is not limited to a sheet of paper. Examples of the "recording medium" include, but are not limited to, a sheet of paper, an overhead projector (OHP) transparency, fabric, a metal sheet, a plastic film, or a prepreg sheet obtained by impregnating carbon fibers with a resin in advance.

The "recording medium" includes all of a recording sheet, recording paper, and a medium to which a developer or ink can adhere. The sheet of paper may be a sheet of plain paper, thick paper, thin paper, coated paper such as art paper, or tracing paper. Examples of the sheet of paper include, but are not limited to, a postcard and an envelope in addition to the aforementioned kinds of sheets of paper.

"Image formation" described below means applying images with meanings such as characters and figures to media and applying images with no meanings such as patterns to media.

Now, a description is given of an image forming apparatus according to an embodiment of the present disclosure.

In FIG. 1, an image forming apparatus 100 serving as a laser printer in the present embodiment includes a rectangular parallelepiped housing as a body of the image forming apparatus 100. The rectangular parallelepiped housing is defined by first to third directions. The first direction is a depth direction (front-back direction) of the housing and is indicated by a double-headed arrow X in FIG. 1. The second direction is a lateral direction (left-right direction) of the housing and is indicated by a double-headed arrow Y in FIG. 1. The second direction is perpendicular to the first direction. The third direction is a vertical direction (up-down direction) of the housing and is indicated by a double-headed arrow Z. The third direction is perpendicular to the first direction and the second direction. The depth, lateral, and vertical directions may be referred to as directions X, Y, and Z, respectively, in the following description. The direction X corresponds to the width direction of a sheet as a recording medium. The width direction of the sheet is parallel to the width direction of the image forming apparatus 100 and the longitudinal direction (i.e., axial direction) of a fixing rotator and a counter rotator included in a fixing device 20 described later.

The image forming apparatus 100 includes a document scanning device 200 above an image forming section, which will be described later with reference to FIG. 2, in the vertical direction (i.e., direction Z). An output tray 17 serving as an in-body sheet ejection section is located on an upper face of the body, below the document scanning device 200. An exterior cover 100A, which is an openable and closable member, is disposed on one side of the image forming apparatus 100 in the width direction (i.e., direction Y) as the lateral direction of the image forming apparatus 100. When the exterior cover 100A is open, the fixing device 20 disposed inside the housing is visible from the outside through an access opening 100B as illustrated in FIGS. 3A and 3B.

Figure 2:
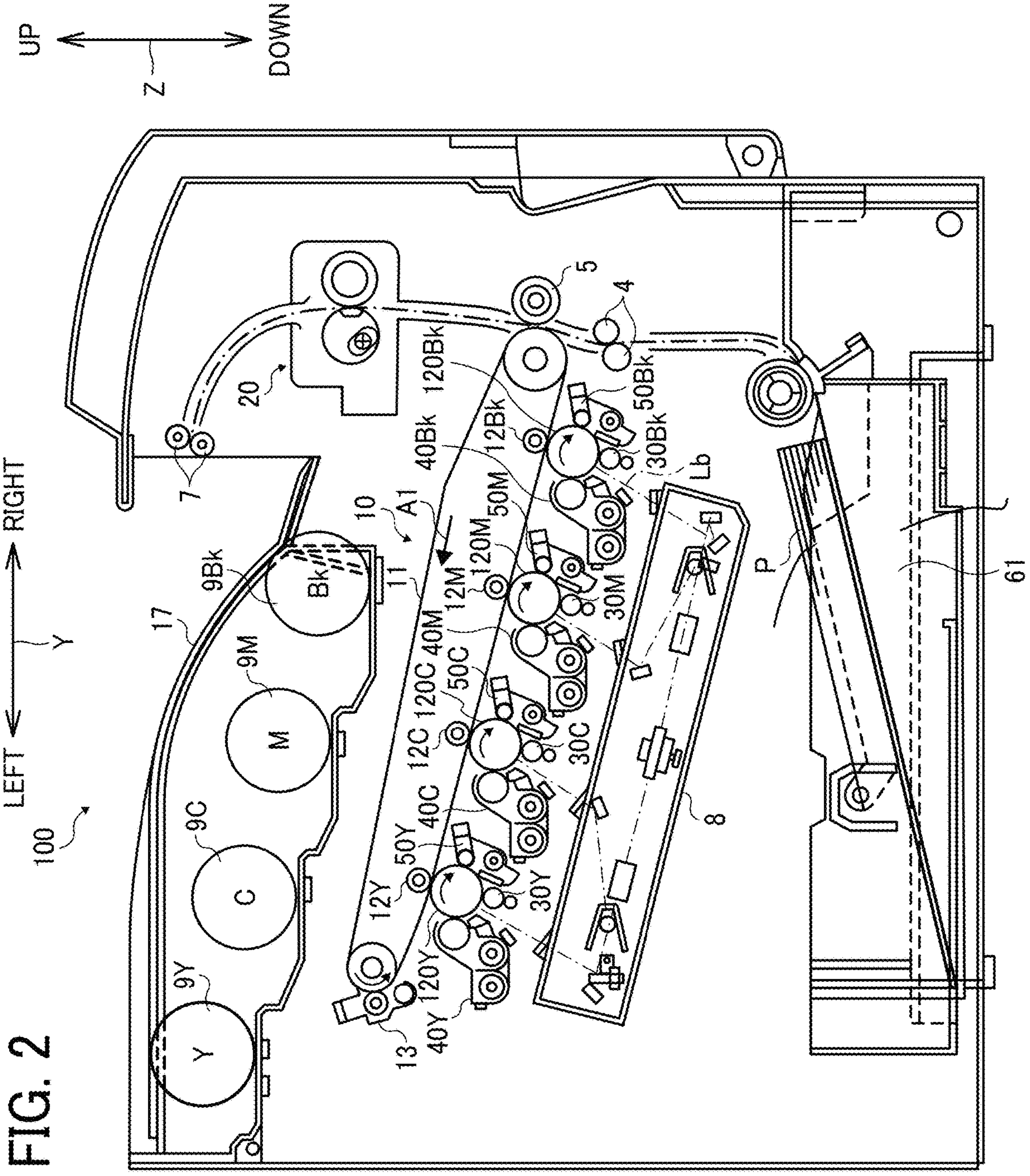
FIG. 2 is a schematic diagram illustrating an internal configuration of the image forming apparatus.
Figure 3A:
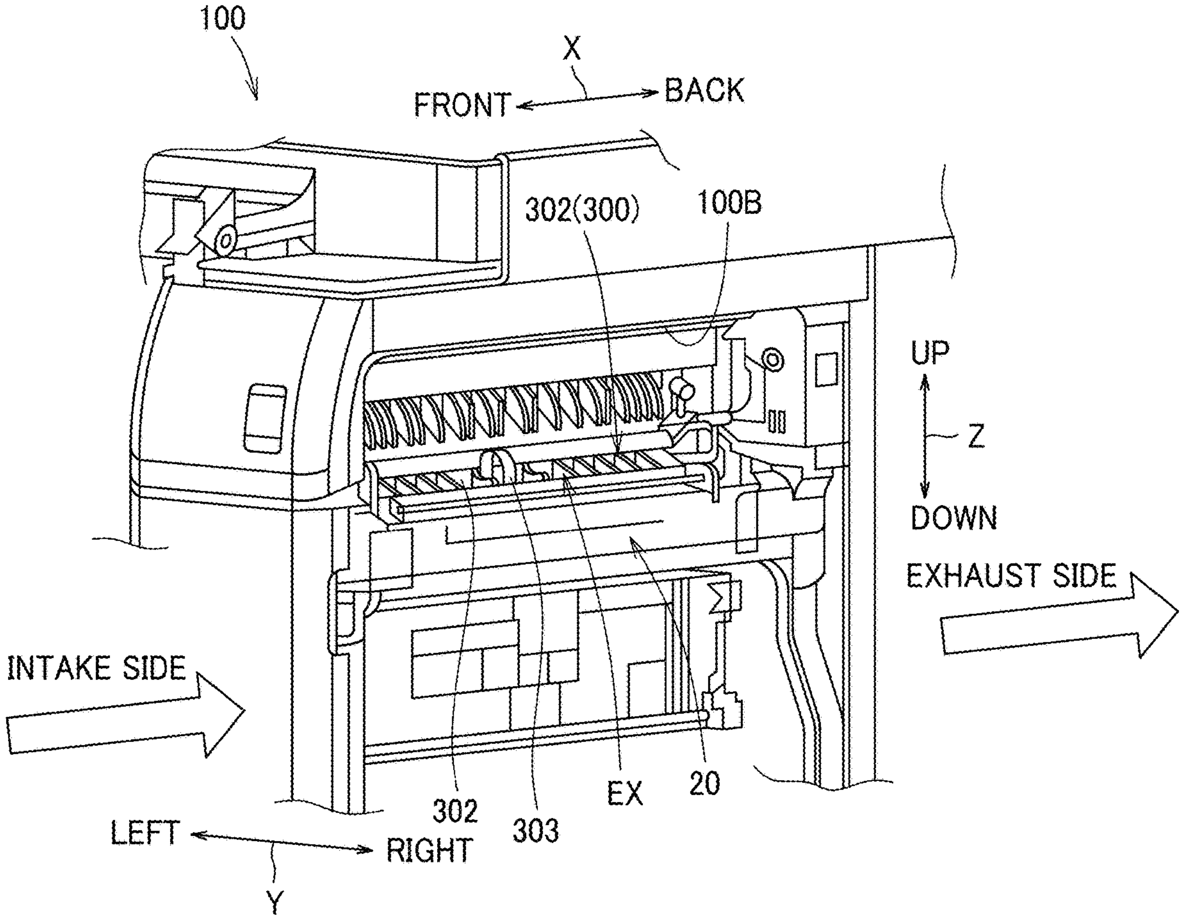
FIG. 3A is an external perspective view of the image forming apparatus from which an exterior cover is removed.
Figure 3B:
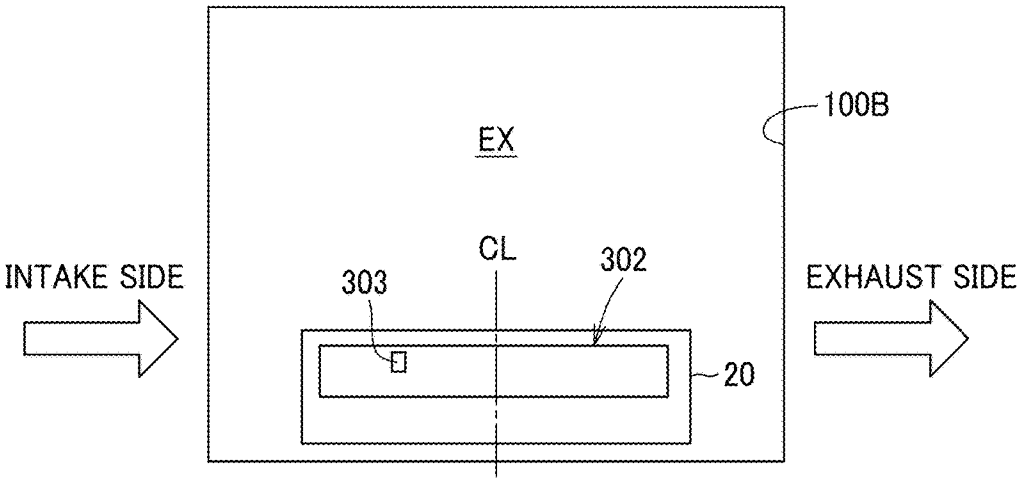
FIG. 3B is a schematic diagram illustrating the inside of an access opening of the image forming apparatus from which the exterior cover is removed.

FIG. 2 illustrates an internal configuration of the image forming apparatus 100. FIG. 2 illustrates the configuration below the document scanning device 200 illustrated in FIG. 1.

In the image forming apparatus 100 illustrated in FIG. 2, visible images formed on respective drum-shaped photoconductors 120Y, 120C, 120M, and 120Bk are sequentially transferred to a transfer belt 11, which is movable in a direction indicated by an arrow A1 while facing the photoconductors 120Y, 120C, 120M, and 120Bk. The direction indicated by the arrow A1 may be referred to simply as a direction A1 in the following description.

The aforementioned transfer process corresponds to a primary transfer process in which the images are sequentially transferred onto the transfer belt 11 to form superimposed transfer images. Thereafter, in a secondary transfer process, the superimposed transfer images are collectively transferred from the transfer belt 11 onto a sheet P, which is, e.g., a recording sheet, to form a composite image on the sheet P.

Each of the photoconductors 120Y, 120C, 120M, and 120Bk is surrounded by various pieces of equipment to form an image as each of the photoconductors 120Y, 120C, 120M, and 120Bk rotate.

Now, a description is given of the formation of a black toner image with the photoconductor 120Bk as an example. The photoconductor 120Bk is surrounded by a charger 30Bk, a developing device 40Bk, a primary transfer roller 12Bk, and a cleaner 50Bk in this order along a direction of rotation of the photoconductor 120Bk. A black toner image is formed on the photoconductor 120Bk while the photoconductor 120Bk rotates. Like the photoconductor 120Bk, the photoconductors 120Y, 120C, and 120M are surrounded by chargers 30Y, 30C, and 30M, developing devices 40Y, 40C, and 40M, primary transfer rollers 12Y, 12C, and 12M, and cleaners 50Y, 50C, and 50M in this order along a direction of rotation of the photoconductors 120Y, 120C, and 120M, respectively. An optical scanning device 8, which will be described later, is used for writing that is performed after charging.

As the transfer belt 11 rotates in the direction A1, visible images that are formed on the photoconductors 120Y, 120C, 120M, and 120Bk are sequentially transferred onto the transfer belt 11 such that the visible images are superimposed one atop another on the transfer belt 11. Specifically, in the primary transfer process, the primary transfer rollers 12Y, 12C, 12M, and 12Bk facing the photoconductors 120Y, 120C, 120M, and 120Bk, respectively, via the transfer belt 11 apply a primary transfer bias to the corresponding photoconductors 120Y, 120C, 120M, and 120Bk to sequentially transfer the images onto the transfer belt 11 in the direction A1.

The photoconductors 120Y, 120C. 120M, and 120Bk, each being accommodated in a process cartridge, are arranged in this order in the direction A1. The photoconductors 120Y, 120C, 120M, and 120Bk are located in four image forming stations that form yellow, cyan, magenta, and black images, respectively. The four image forming stations may be referred to as yellow, cyan, magenta, and black image forming stations in the following description.

The image forming apparatus 100 includes a transfer belt unit 10 to execute the primary transfer process. The transfer belt unit 10 includes the transfer belt 11 and the primary transfer rollers 12Y, 12C, 12M, and 12Bk facing the photoconductors 120Y, 120C, 120M, and 120Bk, respectively, via the transfer belt 11. The superimposed transfer images on the transfer belt 11 are collectively transferred onto the sheet P by a secondary transfer roller 5 that rotates together with the transfer belt 11.

The image forming apparatus 100 includes, in addition to the process cartridges and the transfer belt unit 10 described above, a cleaning device 13 that cleans the transfer belt 11 and the optical scanning device 8. The optical scanning device 8 is an optical writing device disposed below the four image stations so as to face the four image forming stations. The optical scanning device 8 includes, e.g., a semiconductor laser serving as a light source, a coupling lens, an fθ lens, a toroidal lens, a mirror, and a rotatable polygon mirror.

The optical scanning device 8 emits a laser beam Lb, corresponding to image data for each color of yellow, cyan, magenta, and black, to each of the photoconductors 120Y, 120C, 120M, and 120Bk. For example, as illustrated in FIG. 2, the optical scanning device 8 emits the laser beam Lb corresponding to image data of black to the photoconductor 120Bk disposed in the black image forming station. As a result, electrostatic latent images are formed on the photoconductors 120Y, 120C, 120M, and 120Bk.

To convey the sheets P as recording media, the image forming apparatus 100 includes, e.g., a sheet feeding device 61 and a registration roller pair 4. The sheet feeding device 61 feeds the sheet P on which the superimposed transfer images are collectively transferred in the secondary transfer process. The registration roller pair 4 sets registration timing for the sheet P fed from the sheet feeding device 61 and feeds the sheet P to a secondary transfer position. The image forming apparatus 100 further includes a sensor that detects the arrival of the leading end of the sheet P at the registration roller pair 4.

The sheet P bearing the superimposed transfer images collectively transferred from the transfer belt 11 as a toner image T in the secondary transfer process is conveyed to the fixing device 20 as illustrated in FIG. 2. In the fixing device 20, the toner image T is fixed onto the sheet P. A detailed description of the fixing device 20 is deferred. After the toner image T is fixed, the sheet P is ejected, via an output roller pair 7, toward the output tray 17 disposed outside the body of the image forming apparatus 100. As illustrated in FIG. 2, the image forming apparatus 100 includes replenishment tanks 9Y, 9C, 9M, and 9Bk from each of which new toner is supplied to the corresponding developing device disposed in the image forming station for each color.

Figure 4A:
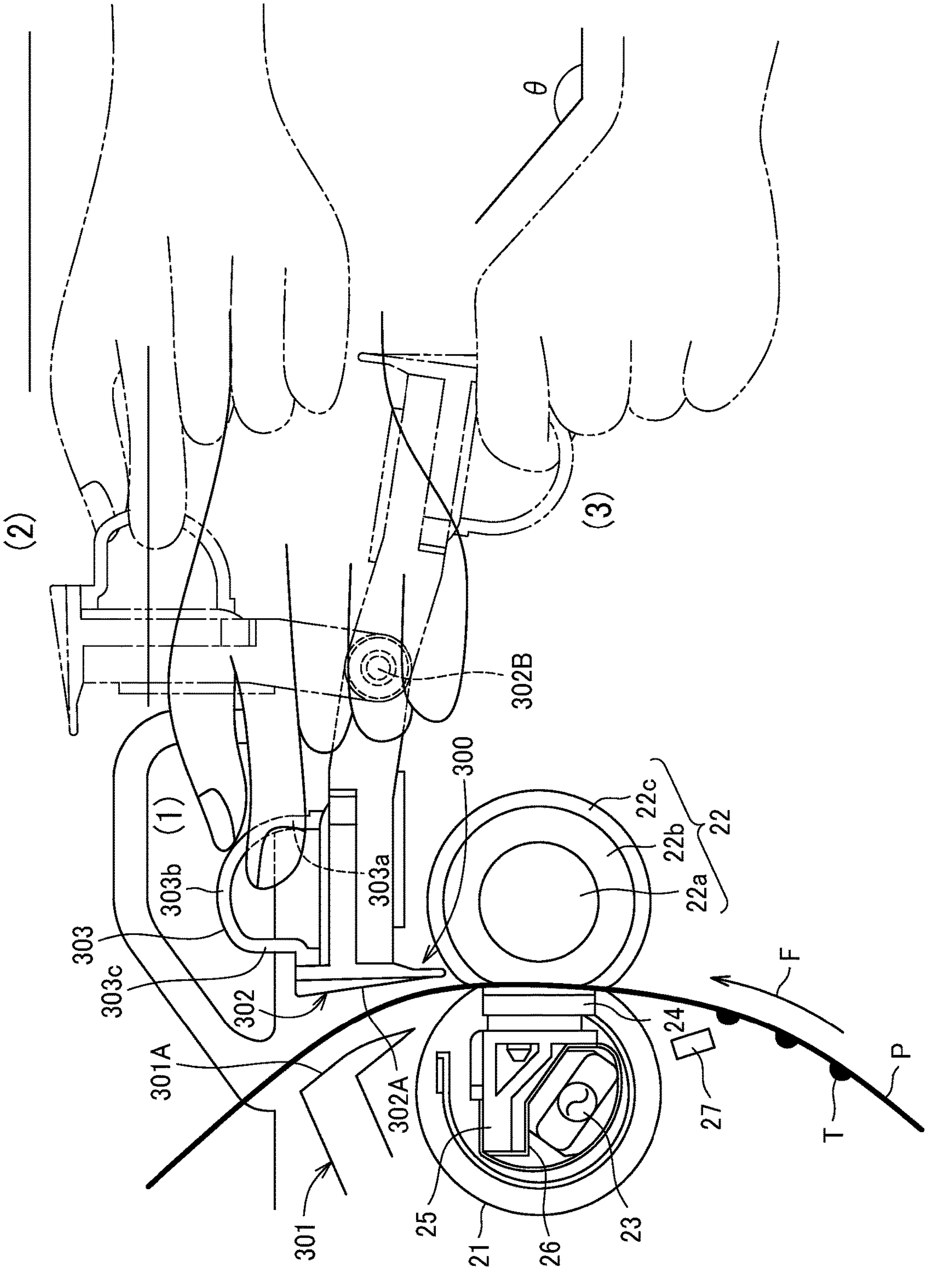
FIG. 4A is a diagram illustrating a configuration of a fixing device and the sheet conveying device included in the image forming apparatus.

As illustrated in FIG. 4A, the fixing device 20 is used to cause the transferred toner image T borne on the sheet P to melt and permeate under heat and pressure to fix the toner image T onto the sheet P. The fixing device 20 includes a flexible fixing belt 21 that is rotatable while being heated.

The fixing device 20 includes, in addition to the fixing belt 21, a pressure roller 22 as a counter rotator that contacts the fixing belt 21 and applies pressure between the pressure roller 22 and the fixing belt 21 to form a nip N between the pressure roller 22 and the fixing belt 21. Inside a loop formed by the fixing belt 21 is a heater 23 including a halogen lamp as a heat source to heat a circumferential span of the fixing belt 21 other than a nip-forming span of the fixing belt 21 adjacent to the nip N. In the present embodiment, the heater 23 heats a circumferential span of the fixing belt 21 rotating away from the nip N.

A nip formation pad 24, a stay 25, and a reflector 26 are also disposed inside the loop formed by the fixing belt 21. The nip formation pad 24 is a base to form the nip N. The stay 25 supports the nip formation pad 24. The reflector 26 reflects, to the fixing belt 21, light emitted from the heater 23. The nip formation pad 24 serving as a base to form the nip N includes a low-friction sliding sheet that is wound around the base pad and contacts the fixing belt 21.

Although FIG. 4A illustrates the flat nip N formed by the nip formation pad 24, the shape of the nip N is not limited to the flat shape. For example, the nip N may be concave along a circumferential surface of the pressure roller 22. In this case, since the leading end of the sheet P passing through the nip N comes toward the pressure roller 22, the concave nip N facilitates the separation of the sheet P from the fixing belt 21.

The temperature of the fixing belt 21 is detected by a temperature sensor 27 that is disposed near the entrance of the nip N from which the sheet P enters the nip N. The detected temperature of the fixing belt 21 is used for feedback processing of the heater 23. FIG. 4A illustrates, by an arrow F, a conveyance direction in which the sheet P is conveyed. The conveyance direction of the sheet P that is indicated by the arrow F may be referred to as a conveyance direction F in the following description.

The fixing belt 21 is a thin, flexible, endless belt shaped like a sleeve and includes a base and a release layer located on a surface of the base. The base is made of a metal material such as nickel or steel use stainless (SUS) or a resin material such as polyimide. The release layer is made of, e.g., tetrafluoroethylene-perfluoroalkylvinylether copolymer (PFA) or polytetrafluoroethylene (PTFE) to facilitate the separation of toner on the sheet P from the release layer.

The pressure roller 22 includes a core 22*a*, an elastic layer 22*b* resting on the core 22*a*, and a release layer 22*c* resting on the elastic laver 22*b*. The elastic layer 22*b* is made of, e.g., silicone rubber foam, silicone rubber, or fluoro rubber. The release layer 22*c* is made of, e.g., PFA or PTFE. The pressure roller 22 is pressed toward the fixing belt 21 by a presser to contact the fixing belt 21 and the nip formation pad 24 as a base via the fixing belt 21. At a position where the pressure roller 22 and the fixing belt 21 are in contact with each other, the pressure roller 22 is pressed against the fixing belt 21 while the elastic layer 22*b* of the pressure roller 22 is deformed, allowing the nip formation pad 24 to keep the nip N having a given width.

The pressure roller 22 is rotated by a driver such as a motor disposed inside the body of the image forming apparatus 100. As the pressure roller 22 is rotated, a driving force of the driver is transmitted from the pressure roller 22 to the fixing belt 21 at the nip N, thus rotating the fixing belt 21 in accordance with the rotation of the pressure roller 22.

As illustrated in FIG. 4A, the pressure roller 22 is solid. Alternatively, the pressure roller 22 may be hollow. In this case, a heating source such as a halogen heater using radiant heat may be disposed inside the pressure roller 22.

In a case where the fixing belt 21 does not include the elastic layer 22*b*, the fixing belt 21 has a decreased thermal capacity that improves the fixing property of being heated quickly to a desired fixing temperature at which a toner image is fixed onto a sheet. However, as the fixing belt 21 and the pressure roller 22 sandwich and press an unfixed toner image onto the sheet, slight surface asperities in the fixing belt 21 may be transferred onto the toner image on the sheet, resulting in variation in gloss of a solid portion of the toner image fixed onto the sheet. To address such a situation, the fixing belt 21 preferably includes an elastic layer having a thickness not smaller than 100 μm.

As the pipe-shaped metal used for the hollow roller, e.g., aluminum, iron, or stainless steel may be selected. In a case where a heat source is disposed inside the pressure roller 22, a surface of a support may be preferably provided with a heat insulation layer or a heat-ray reflection face by mirror surface treatment, to prevent the support from being heated by radiant heat from the heat source. In this case, the heat source is not limited to the halogen heater described above. For example, the heat source may be an induction heating (IH) heater, a resistive heat generator, or a carbon heater.

In the image forming apparatus 100 including the fixing device 20 having the configuration described above, a sheet conveying device is disposed to convey sheets. In the present embodiment, a sheet conveying device 300 conveys the sheets P passing through the nip N of the fixing device 20.

Figure 5:
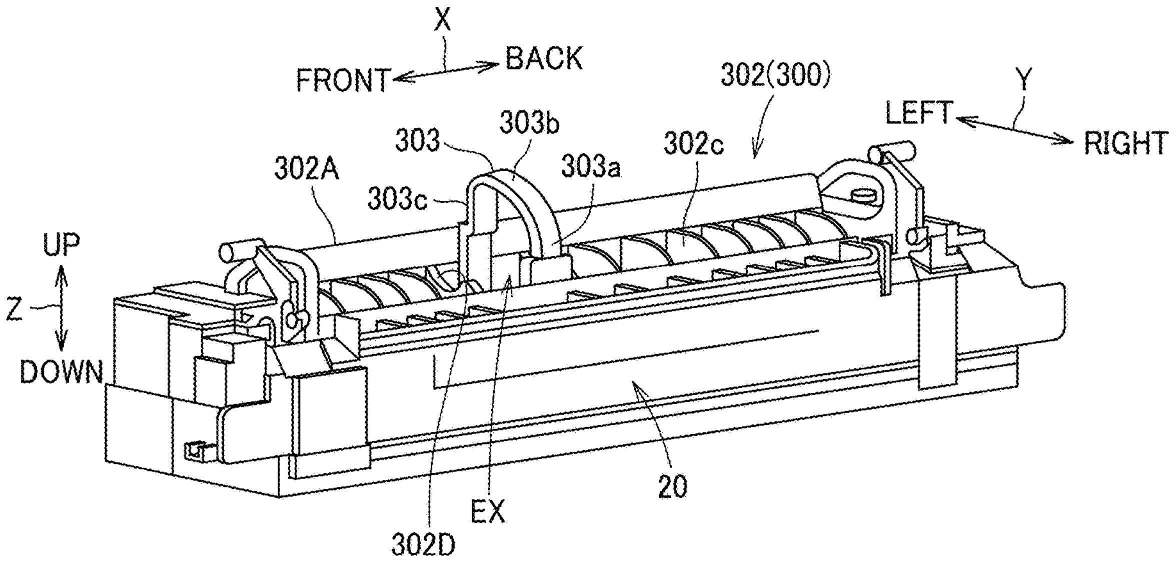
FIG. 5 is an external perspective view of the fixing device illustrated in FIG. 4A.

As illustrated in FIG. 5, the sheet conveying device 300 defines an exit-side conveyance passage continuously from the exit of the fixing device 20, to convey the sheet P having passed through the nip N toward the output tray 17 illustrated in FIG. 2.

As illustrated in FIG. 4A, the sheet conveying device 300 includes a pair of conveyance guides 301 and 302, which is a pair of fixing-exit guides serving as a pair of conveyors. The conveyance guide 301 and the conveyance guide 302 include conveyance faces 301A and 302A, respectively, to convey the sheet P that is used as a recording medium in the image forming apparatus 100. The conveyance guide 301 is fixed, whereas the conveyance guide 302 faces one side of the sheet P and is swingable as will be described later with reference to FIG. 6 to FIG. 7E.

The conveyance guide 302 may be referred to as a swingable conveyance guide 302 in the following description. The arrows X, Y, and Z that are used in the following description have the same meanings as the arrows X, Y. and Z described above with reference to FIG. 1. In particular, the arrow X among these arrows corresponds to a sheet width direction parallel to an axial direction of the pressure roller 22 serving as a counter rotator.

Figure 6:
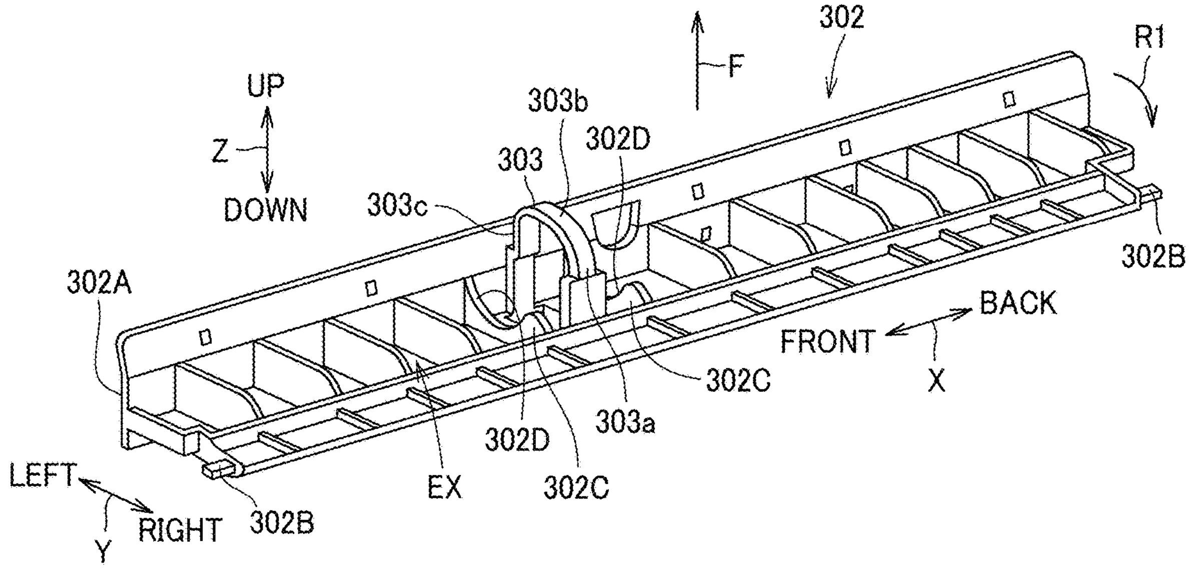
FIG. 6 is a perspective view of the sheet conveying device included in the image forming apparatus.

As illustrated in FIG. 6, the swingable conveyance guide 302 includes the conveyance face 302A extending in the direction X as the first direction to convey the sheet P in the image forming apparatus 100. The sheet P can be moved along the conveyance direction F between the fixed conveyance guide 301 and the swingable conveyance guide 302.

As illustrated in FIGS. 3A and 3B, the conveyance guide 302 includes an exposure face EX that is opposite to the conveyance face 302A and exposed to the outside of the image forming apparatus 100 while the exterior cover 100A of the image forming apparatus 100 is open. In other words, the exposure face EX is exposed to the outside of the image forming apparatus 100 while the inside of the image forming apparatus 100 is open in the direction Y as the second direction to the left or right of the image forming apparatus 100, particularly to the right in the present embodiment.

As illustrated in FIG. 6, the swingable conveyance guide 302 is shaped like a shallow box extending in the first direction (i.e., direction X). The conveyance face 302A for conveying the sheet P is an outer face on one side (left side in the direction Y in the present embodiment) of the box shape. The conveyance face 302A faces the conveyance face 301A of the fixed conveyance guide 301 so that the sheet P is conveyed upward between the conveyance faces 301A and 302A as illustrated in FIG. 4A.

The swing fulcrum 302B is disposed at an end portion on the opposite side (right side in the direction Y in the present embodiment) of the conveyance guide 302. The swing fulcrum 302B is disposed to swing the conveyance guide 302 laterally in the image forming apparatus 100 around an axis along the direction X when the exterior cover 100A of the image forming apparatus 100 is open. The swing fulcrum 302B is disposed at each longitudinal end portion of the conveyance guide 302 along the direction X.

The swing fulcrum 302B swings the conveyance guide 302 around the axis along the direction X corresponding to the front-back direction as the first direction, to expose the conveyance face 302A. More specifically, the swingable conveyance guide 302 swings in a swing direction indicated by an arrow R1 in FIG. 6 away from the fixed conveyance guide 301 to open part of the exit-side conveyance passage that is continuous from the exit of the fixing device 20.

Inside the conveyance guide 302, a plurality of reinforcing ribs 302C extending in the second direction (i.e., direction Y) and the third direction (i.e., direction Z) are arranged at equal intervals in the first direction (i.e., direction X). The plurality of reinforcing ribs 302C maintains the rigidity of the conveyance guide 302 and the shape of the conveyance face 302A.

Now, a description is given of a handle according to the present embodiment.

The exposure face EX of the conveyance guide 302 is provided with a handle 303. The handle 303 is exposed to the outside of the image forming apparatus 100 and operated to expose the conveyance face 302A of the conveyance guide 302 to the outside of the image forming apparatus 100 while the exterior cover 100A is open. The handle 303 is used as an operation part to separate the swingable conveyance guide 302 from the fixed conveyance guide 301 illustrated in FIG. 4A.

Figures 7A, 7B, 7C, 7D, 7E:
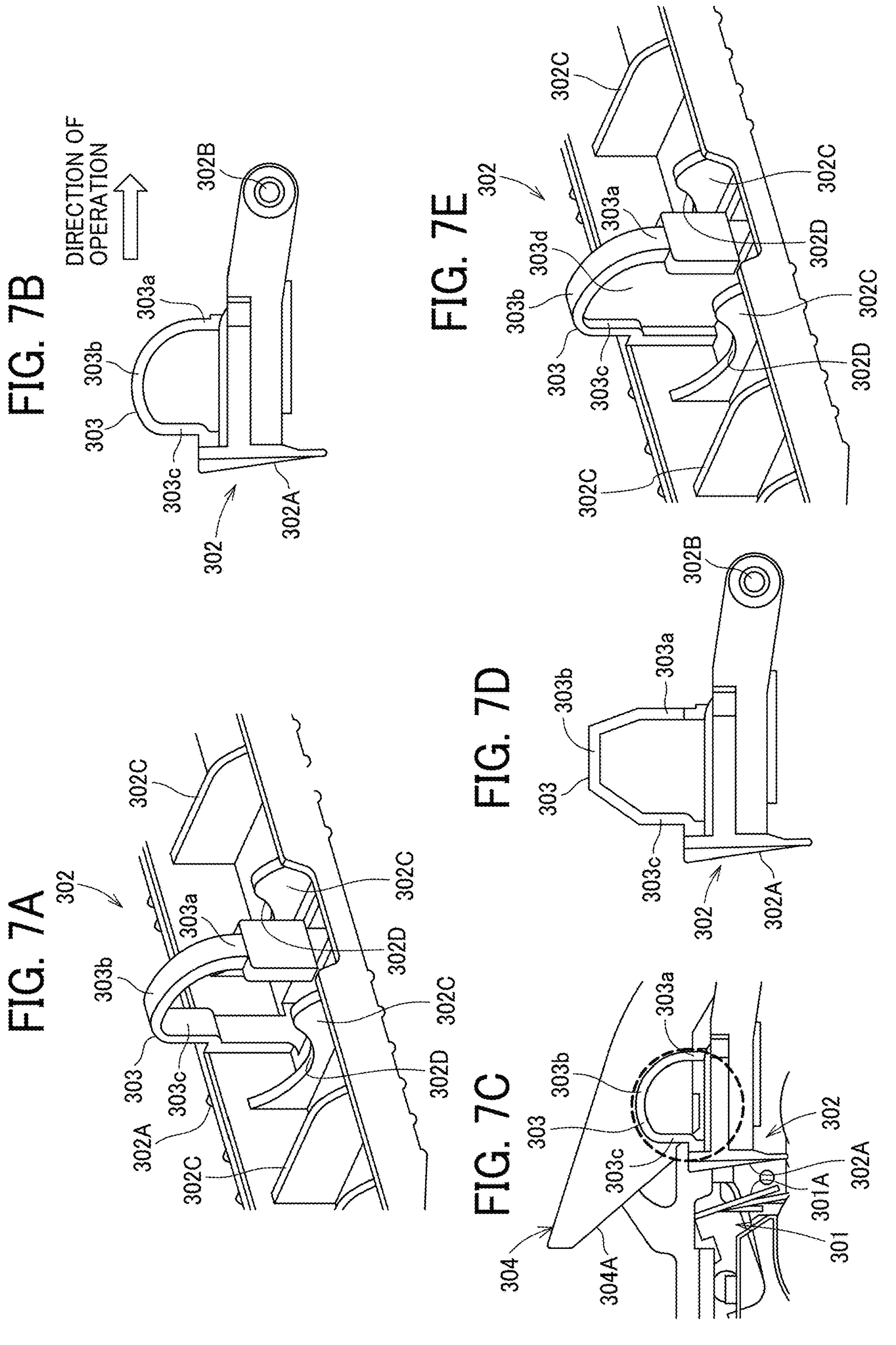
FIGS. 7A to 7E are views of a handle of the sheet conveying device.

On the exposure face EX, as illustrated in FIG. 6, the handle 303 is disposed in a range of, e.g., 105 mm on each side along the direction X from the center in the direction X as the first direction. As illustrated in FIGS. 7A and 7B, the handle 303 includes a partial annular portion that is included in a plane including the swing direction around the swing fulcrum 302B described above. The handle 303 stands from the exposure face EX upward in the direction Z of the image forming apparatus 100 by a given length.

Each of the reinforcing ribs 302C that are disposed on both sides of the handle 303 has an upper end with an arc-shaped recess 302D. The recess 302D prevents the thumb and the index finger sandwiching the handle 303 from interfering with the reinforcing ribs 302C, allowing the user to easily hold the handle 303 with the fingers.

The handle 303 may be disposed at the center serving as a reference position when the above-described range is defined in the direction X. Preferably, however, the handle 303 may be offset in the above-described range from the center in the direction X. FIG. 6 illustrates the handle 303 that is offset toward the front side of the image forming apparatus 100 by, e.g., 55 mm within the above-described range from the center in the direction X.

The handle 303 that is offset toward the front side of the image forming apparatus 100 enhances the visibility from the front side in the direction X, compared with the handle 303 that is disposed at an end of the conveyance guide 302 in the direction X. It may be convenient for a user to perform the jam clearance with the right hand in a case where the dominant arm of the user is the right hand.

In this case, it may be convenient for the user to operate the handle 303 with the left hand to rotate the swingable conveyance guide 302 outward. As illustrated in FIG. 3B, when the user opens the exterior cover 100A and faces the access opening 100B, the handle 303 that is disposed to the left from a center line CL of the conveyance guide 302 allows the user to easily operate the handle 303 with the left hand without difficulty.

The location of the handle 303 as illustrated in FIG. 6 enhances the operability and visibility from the outside. In particular, in a case where another component is disposed at an end in the direction X when the conveyance guide 302 is incorporated into the image forming apparatus 100, the component does not hide the handle 303 located as illustrated in FIG. 6 and therefore the user can confirm the handle 303. In short, the handle 303 is visible.

To maintain the visibility and operability, two or more handles 303 may be disposed along the direction X. In a case where the two or more handles 303 are disposed along the direction X, at least one of the handles 303 is located within the above-described range to allow the user to easily confirm the existence of the handle 303 closer to the center than to the end of the conveyance guide 302 in the direction X.

Now, a description is given of cooling of the fixing device 20.

Since the fixing device 20 is heated to a high temperature by the heat source disposed in the fixing device 20, the fixing device 20 is to be cooled not to overheat the surrounding components. To cool the fixing device 20, the image forming apparatus 100 has a cooling-air intake on the front side of the machine (i.e., image forming apparatus 100) and a cooling-air exhaust on the back side of the machine as illustrated in FIG. 3B. In other words, the front side of the image forming apparatus 100 is an intake side whereas the back side of the image forming apparatus 100 is an exhaust side. When a fan that is disposed at the cooling-air exhaust is driven, the cooling air flows rightward through a cooling-air passage defined laterally in FIG. 3B, inside the image forming apparatus 100.

The temperature of the cooling-air passage tends to increase toward the cooling-air exhaust.

Figure 10:
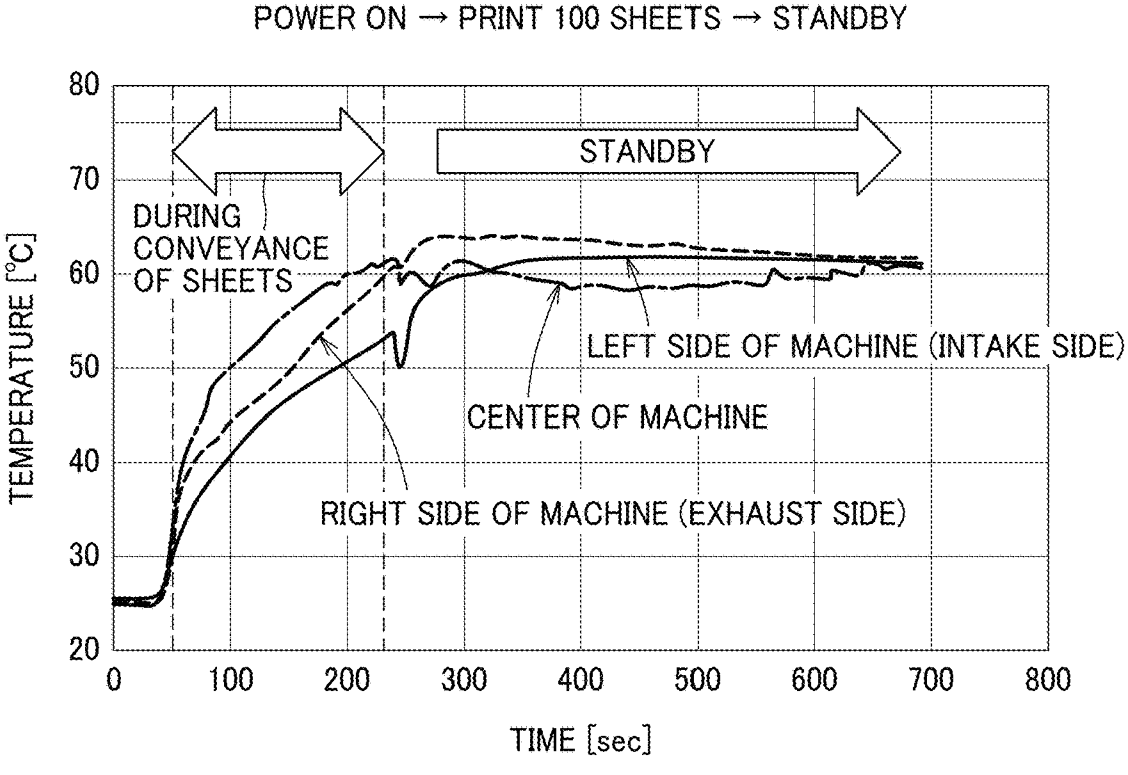
FIG. 10 is a graph of a temperature change from when the power of the sheet conveying device is turned on to when 100 sheets are printed.

FIG. 10 illustrates a temperature distribution during a period of time from when the power of the image forming apparatus 100 is turned on to when the image forming apparatus 100 comes into a standby state after printing (conveying) 100 sheets.

As illustrated in FIG. 10, the temperature of the image forming apparatus 100 rises immediately after starting the conveyance of sheets. Specifically, after the conveyance of sheets has started, the temperature increases most at the center of the machine. The temperature increase is higher on the right side of the machine than on the left side of the machine. In short, the temperature of components is higher on the exhaust side than on the intake side due to the airflow.

For this reason, the handle 303 of the conveyance guide 302 is disposed on the intake side where the temperature is lower than on the exhaust side. A reduced temperature rise of the handle 303 prevents a user from burning the hand holding the handle 303.

Now, a detailed description is given of the handle 303.

As illustrated in FIGS. 6, 7A, and 7B, the handle 303 projects upward beyond the upper end of the conveyance face 302A. The upper end of the conveyance face 302A corresponds to a downstream end of the conveyance face 302A in the conveyance direction, which is the direction Z.

Specifically, as illustrated in FIGS. 7A and 7B, the handle 303 includes the partial annular portion coupled to the upper face of the conveyance guide 302 at two positions in the direction Y. In other words, the partial annular portion or the ring-shaped handle 303 is included in the plane including the swing direction around the swing fulcrum 302B as described above.

The ring-shaped handle 303 includes, as the lowest portion, a coupled portion 303*a* that is coupled to the upper face of the conveyance guide 302 and closer to the swing fulcrum 302B than the other portion of the ring-shaped handle 303. The ring-shaped handle 303 includes, as the highest portion, a top portion 303*b* that is located upstream from the coupled portion 303*a* in a direction of operation of the handle 303 indicated by the arrow in FIG. 7B.

The ring-shaped handle 303 includes a coupled portion 303*c* that is located at a left end of the handle 303 in the direction Y, farthest from the swing fulcrum 302B in the direction opposite to the direction of operation of the handle 303 indicated by the arrow in FIG. 7B. The coupled portion 303*c* is a linear portion standing upright on the upper face of the conveyance guide 302. The partial annular portion from the right coupled portion 303*a* to the left coupled portion 303*c* via the top portion 303*b* is shaped like a smoothly continuous substantially circular arc. The arc-shaped partial annular portion allows a user to open and close the conveyance guide 302 without difficulty by naturally sliding and moving the fingers pinching the handle 303.

As illustrated in FIG. 7C, the linear coupled portion 303*c* of the handle 303 is formed backward to the swing fulcrum 302B (rightward in the direction Y) so as not to overlap an inclined conveyance face 304A of another conveyance guide 304 that is disposed downstream from the conveyance guide 302 in the direction X as the first direction. If the coupled portion 303*c* extends not linearly but in an arc shape as indicated by the broken circle in FIG. 7C and is coupled to the upper face of the conveyance guide 302, the arc-shaped coupled portion overlaps an upstream end of the inclined conveyance face 304A of the downstream conveyance guide 304 in the direction X.

In short, the leading end of the sheet P that is conveyed from the conveyance face 302A to the inclined conveyance face 304A may interfere with the arc-shaped coupled portion. To prevent such a situation, the coupled portion 303*c* closer to the inclined conveyance face 304A than the coupled portion 303*a* and the top portion 303*b* of the handle 303 has a linear shape as described above.

The downstream conveyance guide 304 in the direction X is integrally formed on the inner face of the exterior cover 100A.

In a case where the handle 303 is disposed at a position slightly shifted to the right in FIG. 7C as a whole, the handle 303 may be shaped like an arc without a linear portion as illustrated by the broken circle in FIG. 7C.

However, in this case, the conveyance guide 304 also has to be slightly shifted to the right in FIG. 7C. In other words, the image forming apparatus 100 increases in size accordingly. The above-described linear coupled portion 303*c* at one end of the handle 303 easily downsizes the image forming apparatus 100.

As illustrated in FIG. 7C, the partial annular portion of the handle 303 may include a plurality of linear portions. The partial annular portion including the plurality of linear portions attains substantially the same effects as the partial annular portion illustrated in FIGS. 7A and 7B.

As illustrated in FIG. 7E, the handle 303 may include, inside the partial annular portion, a wall portion 303*d* that is parallel to the plurality of reinforcing ribs 302C. The wall portion 303*d* reinforces the partial annular portion of the handle 303.

An interior angle portion at the intersection between the wall portion 303*d* and the partial annular portion of the handle 303 allows a user to hook the thumb and index finger of the left hand on the interior angle portion without difficulty. Such a configuration prevents the user from accidentally separating the fingers from the handle 303, thus enhancing the operability of the handle 303.

In the sheet conveying device 300 according to the embodiment described above, the handle 303 that is used to open and close the swingable conveyance guide 302 is integrated with the conveyance guide 302. In other words, the handle 303 does not have to be newly incorporated into the conveyance face 302A. Such a configuration thus reduces the assembly cost.

On the other hand, at the time of jam clearance, the conveyance guide 302 is swung rightward in the direction Y in FIG. 4A so as to expose the exposure face EX and is separated from the conveyance guide 301 illustrated in FIG. 4A. As a result, a part of the conveyance passage facing the conveyance guide 301 is exposed. The exterior cover 100A is opened to expose the exposure face EX of the swingable conveyance guide 302 on the right side of the image forming apparatus 100 in the direction Y.

In the sheet conveying device 300 according to the embodiment described above, since the handle 303 that is used to open and close the swingable conveyance guide 302 is integrated with the conveyance face 302A of the conveyance guide 302, the handle 303 does not have to be newly incorporated into the conveyance face 302A. Such a configuration thus reduces the assembly cost.

Now, a description is given of the operability of the handle 303.

The operability at the handle 303 is to be enhanced to swing the conveyance guide 302 so as to be opened.

Figure 4B:
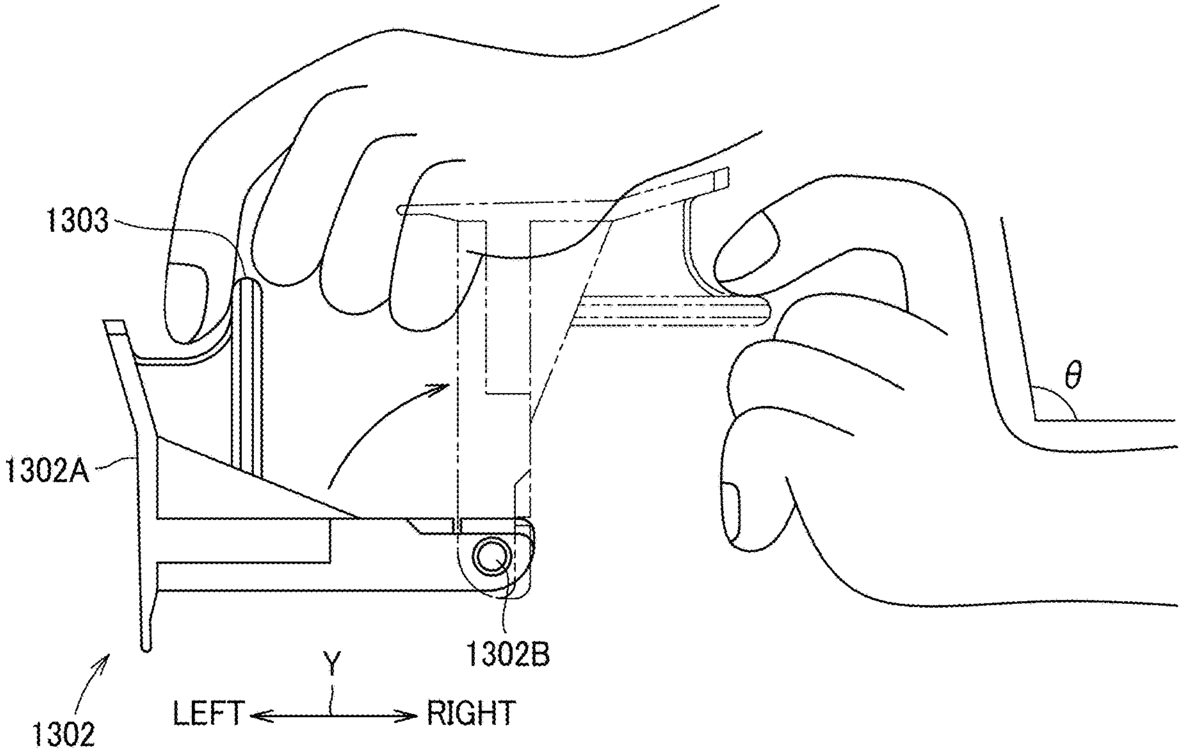
FIG. 4B RELATED ART
FIG. 4B is a diagram illustrating a configuration of a sheet conveying device according to a comparative example.

In a comparative example illustrated in FIG. 4B, an exterior cover on a side face of an image forming apparatus is opened to open one of conveyance guides outward to remove a sheet causing a conveyance failure. Pulling a handle of the conveyance guide frontward opens the conveyance guide outward.

As illustrated in FIG. 4B, a handle 1303 of a conveyance guide 1302 is disposed to be hooked by an index finger. In this configuration, in the latter half of the operation of rotating the conveyance guide 1302 frontward (rightward in FIG. 4B) around a swing fulcrum 1302B, the wrist has to be bent backward in a V-shape. When the wrist is thus bent backward in a V-shape, some users may have pain in the wrist.

By contrast, in the present embodiment, the partial annular portion of the handle 303 is included in the plane including the swing direction around the swing fulcrum 302B. A user holds the partial annular portion between the thumb and index finger of the left hand to operate the handle 303.

In this state, the wrist of the left hand is substantially vertical. Accordingly, when the conveyance guide 302 is rotated around the swing fulcrum 302B through 0°, 90°, and 1800 in this order, the wrist of the left hand holding the handle 303 does not have to be largely bent, unlike the comparative example in which the wrist of the hand holding the handle 1303 is bent as illustrated in FIG. 4B.

When the conveyance guide 302 is rotated about 180° through stages (1), (2), and (3) to be maximally opened as illustrated in FIG. 4A, the wrist of the left hand holding the handle 303 is bent at an angle θ of only about +30° at the maximum with respect to the horizontal state of the wrist. By contrast, in the comparative example illustrated in FIG. 4B, since the wrist of the left hand is horizontal when the conveyance guide 1302 is rotated about 90°, the wrist is bent at an angle θ of +80° or more with respect to the horizontal state of the wrist. It is practically impossible to rotate the conveyance guide 302 by 90° or more because of the pain in the wrist.

According to the present embodiment, when the conveyance guide 302 is maximally rotated around the swing fulcrum 302B, the angle of the wrist of the left hand is reduced by half as compared with the comparative example. Accordingly, the pain in the wrist is greatly alleviated and reduced.

Since the space above the fixing device 20 is narrower as the size of the printer or MFP is smaller, a user may have some difficulty in inserting a hand above the fixing device 20 through the access opening 100B at the time of jam clearance. To facilitate insertion of the hand, the conveyance guide 302 is to be opened outward more widely in a relatively small printer or MFP than in a relatively large printer or MFP. Since the conveyance guide 302 is to be opened more widely in a smaller apparatus, the handle 1303 of the comparative example illustrated in FIG. 4B burdens the wrist.

Although the range of motion of the wrist varies among individuals, the motion of the wrist is in a range of from about 135° to about 175°. In a case where the maximum release angle of the conveyance guide 302 is equal to or greater than 135°, the conveyance guide 302 may not be physically operated only by the angle of the wrist. The present embodiment is effectively applied to such a large release angle.

In FIG. 4A, when the conveyance guide 302 is rotated by 180°, the linear coupled portion 303*c* of the handle 303 comes to the front of the user. For this reason, the thumb and index finger of the left hand holding the handle 303 slide to a position immediately before the coupled portion 303*c* so as to avoid the linear coupled portion 303*c*.

Although the wrist is inevitably bent at an angle θ, the bending of the wrist is not so large as to be painful as compared with the comparative example illustrated in FIG. 4B. In a case where the linear coupled portion 303*c* is shaped like an arc, the wrist may be brought into a substantially horizontal state at an angle θ of about 180°.

Now, a description is given of the relationship between ribs of the downstream conveyance guide 304 and the handle 303.

Figure 8A:
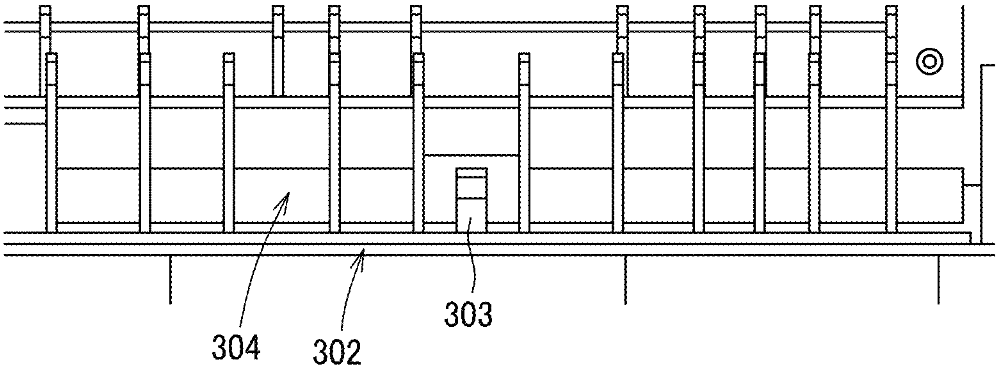
FIG. 8A is a side view of the sheet conveying device including the handle.
Figure 8B:
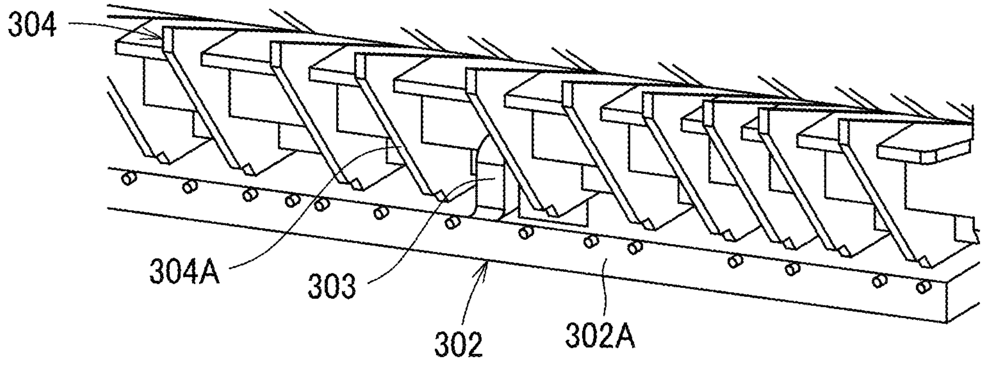
FIG. 8B is a perspective view of the sheet conveying device including the handle.

As illustrated in FIGS. 8A and 8B, the handle 303 may be disposed between the ribs of the downstream conveyance guide 304. Such a configuration saves space and prevents the ribs of the downstream conveyance guide 304 from interfering with the handle 303 when the exterior cover 100A illustrated in FIG. 1 is opened and closed.

The interval between the ribs of the conveyance guide 304 varies depending on the sheet size. The interval between the ribs where the handle 303 is disposed is preferably as wide as possible. Thus, the size of the handle 303 is freely selected.

Now, a description is given of a torsion spring for backward movement.

Figure 9:
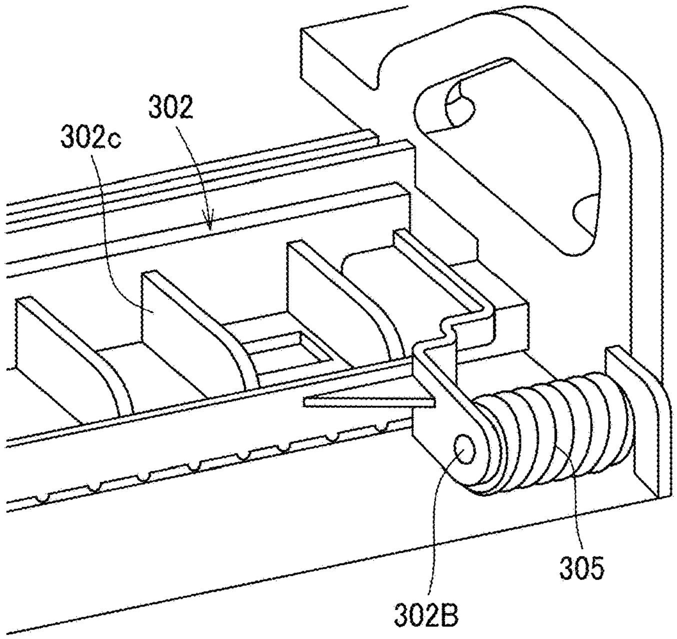
FIG. 9 is a perspective view of a coil spring that urges a conveyance guide included in the sheet conveying device.

As illustrated in FIG. 9, a torsion spring 305 serving as an urger for backward movement may be attached to the swing fulcrum 302B at one longitudinal end of the conveyance guide 302. The torsion spring 305 urges the conveyance guide 302 illustrated in FIG. 7B to rotate counterclockwise around the swing fulcrum 302B. In other words, the torsion spring 305 urges the conveyance guide 302 to swing in a direction opposite to a direction in which the conveyance face 302A is exposed to the outside of the image forming apparatus 100.

When a user separates the hand from the handle 303 while the conveyance guide 302 is opened outward as illustrated in FIG. 4A, the conveyance guide 302 is rotated counterclockwise by an urging force of the torsion spring 305 and automatically returns to the original position. In other words, in a case where the torsion spring 305 is attached, the user keeps holding handle 303 with the left hand to clear the paper jam with the right hand while the conveyance guide 302 is opened outward as illustrated in FIG. 4A. In short, it is important that the user can hold the handle 303 without difficulty to smoothly perform the jam clearance with the right hand.

The conveyance guides described above are not limited to the fixing-exit guides that are disposed at the exit of the fixing device and have the conveyance faces adjacent to the exit of the nip. Alternatively, the conveyance guides may be fixing-entrance guides having the conveyance faces adjacent to the entrance of the nip. As described above, the conveyors may be disposed in the fixing device such that the conveyance faces are adjacent to the nip.

The sheet conveying device including the conveyors may convey the recording media at a position different from the position of the fixing device in the image forming apparatus. The partial annular portion of the handle does not have to be entirely included in the plane including the swing direction around the swing fulcrum. A part of the partial annular portion of the handle may be inclined with respect to the plane including the swing direction. Such a configuration enhances the visibility of the handle and allows a user to pinch the handle more naturally with the thumb and index finger of the hand.

According to one aspect of the present disclosure, the operation of a handle of a conveyance guide is facilitated.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A sheet conveying device, comprising a pair of conveyors each including a conveyance face to convey a recording medium inside an image forming apparatus, one of the pair of conveyors further including:

an exposed face exposed to an outside of the image forming apparatus while an inside of the image forming apparatus is open;

a handle exposed to the outside of the image forming apparatus and operatable to expose the conveyance face to the outside of the image forming apparatus while the inside of the image forming apparatus is open; and a swing fulcrum configured to swing the one of the pair of conveyors to expose the conveyance face to the outside of the image forming apparatus when the handle is operated while the inside of the image forming apparatus is open, the handle including a partial annular portion, the partial annular portion included in a plane including a swing direction around the swing fulcrum.

2. The sheet conveying device according to claim 1, wherein the one of the pair of conveyors extends in a first direction along a front-back direction of the image forming apparatus, wherein the exposed face is exposed in a second direction to right of the image forming apparatus relative to a front of the image forming apparatus, and wherein the handle is disposed between the front and a center of the image forming apparatus in the first direction.

3. The sheet conveying device according to claim 2, wherein the partial annular portion stands in a third direction perpendicular to the first direction and the second direction.

4. The sheet conveying device according to claim 3, wherein the one of the pair of conveyors includes, in the first direction, a plurality of reinforcing ribs extending in the second direction and the third direction, wherein the handle is disposed between a pair of adjacent reinforcing ribs of the plurality of reinforcing ribs, and wherein each of the pair of reinforcing ribs has an upper end with a recess.

5. The sheet conveying device according to claim 1, wherein the partial annular portion includes an arc portion.

6. The sheet conveying device according to claim 5, wherein the partial annular portion includes a linear portion at an end of the partial annular portion in a direction to left of the image forming apparatus relative to a front of the image forming apparatus, and the linear portion extends in a conveyance direction in which the recording medium is conveyed along the conveyance face.

7. The sheet conveying device according to claim 6, wherein the one of the pair of conveyors includes, in a first direction along a front-back direction of the image forming apparatus, a plurality of reinforcing ribs extending in a second direction to right of the image forming apparatus relative to the front of the image forming apparatus and a third direction perpendicular to the first direction and the second direction, wherein the handle includes:

a wall portion parallel to the plurality of reinforcing ribs inside the partial annular portion; and an interior angle portion at an intersection between the wall portion and the partial annular portion.

8. The sheet conveying device according to claim 1, wherein the partial annular portion includes a plurality of linear portions.

9. The sheet conveying device according to claim 1, wherein the one of the pair of conveyors further includes an urger that urges the one of the pair of conveyors to swing in a direction opposite to a direction in which the conveyance face is exposed to the outside of the image forming apparatus.

10. A fixing device comprising:

a heat source;

a fixing rotator configured to rotate while being heated by the heat source;

a counter rotator configured to contact the fixing rotator and apply pressure between the counter rotator and the fixing rotator to form a nip between the counter rotator and the fixing rotator; and the sheet conveying device according to claim 1, the conveyance face of the one of the pair of conveyors of the sheet conveying device being adjacent to the nip.

11. The fixing device according to claim 10, wherein the one of the pair of conveyors is a fixing-exit guide configured to convey the recording medium having passed through the nip.

12. An image forming apparatus comprising:

the fixing device according to claim 10; and an openable and closable member configured to open the inside of the image forming apparatus to right of the image forming apparatus relative to a front of the image forming apparatus.

13. The image forming apparatus according to claim 12, wherein air flows through a cooling-air passage inside the image forming apparatus to cool the fixing device, and wherein the air enters from a front side of the image forming apparatus and exits from a back side of the image forming apparatus through the cooling-air passage.

* * * * *